2,916,463

CRYSTALLINE POLYSTYRENE OXIDE HOMOPOLYMERS

Joseph A. Blanchette, East Longmeadow, Mass., assignor to Monsanto Chemical Company, St. Louis, Mo., a corporation of Delaware No Drawing. Application January 2, 1958
Serial No. 706,577

2 Claims. (Cl. 260—2)

This invention relates to novel crystalline polymers. More particularly, it relates to crystalline polystyrene oxide homopolymers as hereinafter described.

The lower polymers of styrene oxide are known, e.g., the dimer, trimer, tetramer, etc. However, these polymers are all oily liquids having no application as resins. Styrene oxide has also been copolymerized with propylene oxide to form high molecular weight copolymers of crystalline nature.

Now, it is an object of this invention to provide resinous homopolymers of styrene ovide.

Another object is to provide crystalline homopolymers of styrene oxide.

A further object is to provide crystalline polystyrene oxide homopolymers having the sharp melting point characteristics of crystalline materials, with the related high heat distortion temperatures and low fabrication temperatures.

These and other objects are attained by reacting anhydrous ferric chloride with a styrene oxide monomer to form a catalyst complex, and subsequently reacting said catalyst complex with a further quantity of the styrene oxide monomer to effect polymerization thereof and produce homopolymers corresponding to the general formula:

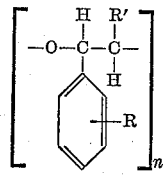

wherein R is a radical selected from the group consisting of hydrogen and alkyl radicals containing from 1–3 carbon atoms, R' is a radical selected from the group consisting of hydrogen and methyl radicals and $n$ is an integer from 10 to 100.

The following examples are given in illustration of the invention and are not intended as limitations thereof.

Example I

One gram mol of anhydrous ferric chloride is suspended in 18 ml. of ethyl ether under a slight nitrogen pressure. About 6 ml. of styrene oxide are added dropwise with stirring while cooling the mixture in an ice-salt bath. When all of the styrene oxide has been added the reaction mixture is allowed to come to room temperature and the mixture is stirred until reaction is completed, circa 10–20 minutes. The product obtained is a complex styrene oxide-ferric chloride salt suspended in ethyl ether solution.

Example II

About 48 ml. of ethyl ether and 20 ml. of styrene oxide are charged to an autoclave equipped with a stirrer. A nitrogen atmosphere is placed upon the contents and 0.4 gram mol of the catalyst complex formed in Example I is added. The autoclave is heated to a temperature of 80° C. and maintained thereat for about 190 hours, after which the contents are cooled and the autoclave opened. Sufficient benzene is then added to the viscous product to obtain a workable solution. The catalyst complex is removed by washing the benzene solution with a 10% aqueous hydrochloric acid solution. Any remaining acid is neutralized by washing the benzene phase with water and a dilute aqueous sodium bicarbonate solution. Vacuum evaporation is employed to remove the benzene and ether. The solid polymer is dissolved in acetone to form a 5% solids solution, which is then cooled to about −30° C. and filtered. The crystalline precipitate is identified as polystyrene oxide by infrared spectrophotometry and is found to be crystalline by X-ray analysis. Molecular weight determination by the cryoscopic method shows the average molecular weight to be about 3000. The crystals have a sharp melting point at 176° C. and are soluble in acetone, alcohol and benzene.

The styrene oxides employed in the process of this invention correspond to the general formula:

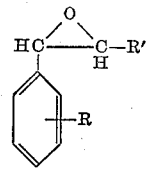

wherein R may be hydrogen or an alkyl radical containing from 1–3 carbon atoms, and R' may be hydrogen or methyl radical. Examples of suitable styrene oxides include styrene oxide, p-methtyl styrene oxide, p-isopropyl styrene oxide, 1-phenyl-2-methylethyl oxide, etc.

The catalyst employed in preparing the homopolymers of this invention is initially anhydrous ferric chloride. Generally, ferric chloride concentrations of from 0.1 to 5% by weight, based upon the total weight of the polymerizable mixture, are used; concentrations of from 0.5 to 2% by weight being especially preferred.

In preparing the homopolymers of this invention, the anhydrous ferric chloride catalyst is first reacted with a stoichiometrically equivalent proportion of the styrene oxide to form a complex which is used as the actual polymerization catalyst. It is preferred to form the complex at low temperatures, i.e., 0°–50° C. but temperatures up to 150° C. may be employed if a sealed pressure vessel is used to prevent evaporation of the styrene oxide. The complex is prepared by suspending the anhydrous ferric chloride in an anhydrous inert organic solvent such as ethyl ether, benzene, dioxane, etc. and then adding the styrene oxide monomer, maintaining an inert atmosphere, e.g., nitrogen. If desired this catalyst complex may be employed in the subsequent polymerization directly as formed. However, it is sufficiently stable that it may be recovered as a powder in solid form and stored in a moisture-free atmosphere for short periods of time before use.

The polymerization is effected by dissolving about 100 parts by weight of the styrene oxide monomer in an anhydrous inert organic solvent, e.g., ethyl ether, benzene, dioxane, etc. under an inert atmosphere. The catalyst complex is then suspended therein in a quantity such as to provide from 0.1–5 parts by weight of ferric chloride and the system is maintained, with stirring, at a temperature of from 20–150° C. until polymerization is complete. The rate of polymerization increases with higher temperatures.

In another embodiment, the complex-salt formation and the subsequent polymerization are effected in a single step wherein from 0.1 to 5 parts by weight of anhydrous ferric chloride are suspended in the inert organic solution of 100 parts by weight of the styrene oxide under an inert atmosphere. The system is maintained at 0°–150° C. until the complex has been formed and the temperature is then adjusted to the desired polymerization temperature in the range of from 20°–150° C.

When the polymerization is complete, a viscous fluid is obtained, which must be purified to recover the crystalline homopolymer. Conventional techniques are adequate for such recovery. Among them may be suggested the following procedure. The viscous product is thinned with sufficient benzene to obtain a free-flowing liquid, which is then washed with a 10% aqueous hydrochloric acid solution, or other dilute acid, to remove the catalyst. The benzene phase is then washed with water and dilute sodium bicarbonate, or other slightly basic solution, to neutralize and remove traces of acid remaining. After filtration the benzene and ether are removed by vacuum evaporation and the solid polymer is dissolved in a solvent such as acetone, cooled and filtered. The crystalline precipitate obtained can be identified by infra-red spectrophotometric analysis and by X-ray to be a crystalline polystyrene oxide. Conventional molecular weight determination shows the crystalline homopolymers to be polymers having a degree of polymerization of from 10 to 100.

The styrene oxide homopolymers of this invention possess several important and unique properties. Their crystalline nature gives them very sharp melting points with a correspondingly sharp transition from rigid solids to free-flowing fluids within a relatively narrow temperature range. Therefore, they possess the anomalous properties of high heat distortion temperatures and relatively low extrusion and fabricating temperatures. They are also transparent and possess high tensile and impact strength.

The crystallinity of these styrene oxide homopolymers makes them distinctly advantageous for directly extruding or molding oriented films, sheets and molded objects. The need for the usual complex after-treatment of the fabricated films, etc. to achieve such orientation is obviated.

The crystalline homopolymers of this invention are further useful as paper coating resins, molding compounds and in forming semi-rigid films for packaging applications, e.g., display box covers, clothing packages, etc. For the latter use the homopolymers are preferably combined with small quantities of a styrene plasticizer to form less brittle films. For example, a satisfactory film may be prepared as follows:

*Example III*

Ten grams of the crystalline styrene oxide homopolymer prepared in Example II are dissolved in 100 ml. of ethyl ether together with 0.5 gram of polyethylene glycol having an average molecular weight of about 400 as plasticizer. After thorough mixing, the syrupy mixture is poured onto a glass plate as a uniform 0.003 inch film. The plate is dried in an oven at 80° C. for 20 minutes after which the film is peeled. The resultant transparent film is relatively inflexible but possesses extremely high strength and may be used for packaging applications in the clothing display field.

It is obvious that many variations may be made in the products and processes of this invention without departing from the spirit and scope thereof.

What is claimed is:

1. A process for preparing crystalline homopolymers comprised of a plurality of recurring monomeric units corresponding to the general formula:

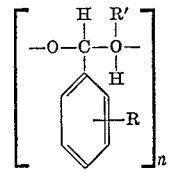

wherein R is a radical selected from the group consisting of hydrogen and alkyl radicals containing from 1 to 3 carbon atoms, R' is a radical selected from the group consisting of hydrogen and methyl radicals and $n$ is an integer of from 10 to 100, which comprises (1) suspending from 0.1 to 5 parts by weight of anhydrous ferric chloride in an inert anhydrous organic solvent and reacting same under an inert atmosphere at a temperature of from 0° to 150° C. with a stoichiometrically equivalent proportion of a styrene oxide monomer to form a polymerization catalyst complex, and (2) subsequently polymerizing about 100 parts by weight of said styrene oxide monomer in the presence of said catalyst complex in an inert anhydrous organic solution and under an inert atmosphere at a temperature of from 20° to 150° C.; said styrene oxide monomer corresponding to the general formula:

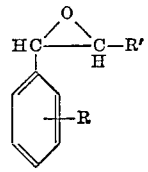

wherein R is a radical selected from the group consisting of hydrogen and alkyl radicals containing from 1 to 3 carbon atoms, R' is a radical selected from the group consisting of hydrogen and methyl groups.

2. A process as in claim 1 wherein the styrene oxide monomer is styrene oxide.

References Cited in the file of this patent

UNITED STATES PATENTS

| | | |
|---|---|---|
| 2,706,182 | Pruitt et al. | Apr. 12, 1955 |
| 2,792,375 | Bartleson | May 14, 1957 |
| 2,870,099 | Barrows et al. | Jan. 20, 1959 |
| 2,870,100 | Stewart et al. | Jan. 20, 1959 |

UNITED STATES PATENT OFFICE
CERTIFICATE OF CORRECTION

Patent No. 2,916,463                                    December 8, 1959

Joseph A. Blanchette

It is hereby certified that error appears in the printed specification of the above numbered patent requiring correction and that the said Letters Patent should read as corrected below.

Column 1, line 25, for "ovide" read -- oxide --; column 2, line 33, for "p-methtyl" read -- p-methyl --; column 4, lines 12 to 19, for that portion of the formula reading

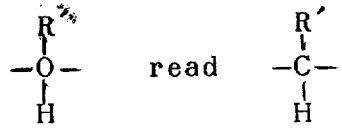

Signed and sealed this 21st day of June 1960.

(SEAL)
Attest:

KARL H. AXLINE                              ROBERT C. WATSON
Attesting Officer                         Commissioner of Patents